(12) United States Patent
Kee et al.

(10) Patent No.: US 7,295,687 B2
(45) Date of Patent: Nov. 13, 2007

(54) FACE RECOGNITION METHOD USING ARTIFICIAL NEURAL NETWORK AND APPARATUS THEREOF

(75) Inventors: Seok-cheol Kee, Kyungki-do (KR); Tae-kyun Kim, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 831 days.

(21) Appl. No.: 10/630,787

(22) Filed: Jul. 31, 2003

(65) Prior Publication Data

US 2004/0034611 A1 Feb. 19, 2004

(30) Foreign Application Priority Data

Aug. 13, 2002 (KR) .................... 10-2002-0047898

(51) Int. Cl.
*G06K 9/00* (2006.01)

(52) U.S. Cl. .................... 382/118; 340/5.53; 340/5.83; 382/156; 382/159; 382/224; 706/2; 706/20

(58) Field of Classification Search ............... 340/5.52, 340/5.53, 5.83; 359/559, 561; 382/118, 382/156, 159, 224; 706/2, 52, 20
See application file for complete search history.

(56) References Cited

U.S. PATENT DOCUMENTS

| | | | | | |
|---|---|---|---|---|---|
| 5,699,449 A | * | 12/1997 | Javidi | ................. | 382/156 |
| 5,842,194 A | * | 11/1998 | Arbuckle | ................. | 706/52 |
| RE36,041 E | * | 1/1999 | Turk et al. | ................. | 382/118 |
| 6,920,231 B1 | * | 7/2005 | Griffin | ................. | 382/115 |
| 6,944,319 B1 | * | 9/2005 | Huang et al. | ................. | 382/118 |
| 7,035,456 B2 | * | 4/2006 | Lestideau | ................. | 382/164 |
| 7,050,607 B2 | * | 5/2006 | Li et al. | ................. | 382/118 |
| 7,142,697 B2 | * | 11/2006 | Huang et al. | ................. | 382/118 |
| 7,164,781 B2 | * | 1/2007 | Kim et al. | ................. | 382/118 |
| 7,187,786 B2 | * | 3/2007 | Kee | ................. | 382/118 |
| 7,203,346 B2 | * | 4/2007 | Kim et al. | ................. | 382/118 |
| 7,218,759 B1 | * | 5/2007 | Ho et al. | ................. | 382/118 |
| 2003/0007669 A1 | * | 1/2003 | Martinez | ................. | 382/118 |
| 2004/0034611 A1 | * | 2/2004 | Kee et al. | ................. | 706/20 |
| 2004/0091137 A1 | * | 5/2004 | Yoon et al. | ................. | 382/118 |
| 2004/0213454 A1 | * | 10/2004 | Lai et al. | ................. | 382/159 |
| 2005/0147292 A1 | * | 7/2005 | Huang et al. | ................. | 382/159 |

* cited by examiner

*Primary Examiner*—Gregory M Desire
(74) *Attorney, Agent, or Firm*—Buchanan Ingersoll & Rooney PC (57) ABSTRACT

A face recognition method using artificial neural network and an apparatus thereof are provided. The apparatus comprises an eigenpaxel selection unit which generates eigenpaxels indicating characteristic patterns of a face and selects a predetermined number of eigenpaxels among the generated eigenpaxels; an eigenfiltering unit which filters an input image with the selected eigenpaxels; a predetermined number of neural networks, each of which corresponds to one of the selected eigenpaxels, receives an image signal which is filtered by the corresponding eigenpaxel, and output a face recognition result; and a determination unit which receives the recognition result from each of the neural networks and outputs a final face recognition result of the input image.

34 Claims, 8 Drawing Sheets

```
Grade sequence :
if            conf ≥ 0.8,       then A,
if    0.8 > conf ≥ 0.6,         then B,
if    0.6 > conf ≥ 0.4,         then C,
if    0.4 > conf ≥ 0.2,         then D,
if    0.2 > conf ≥ 0.1,         then E,
if    0.1 > conf ≥ 0.01,        then F,
if    0.01 > conf ≥ 0.001,      then G,
if    0.001 > conf ≥ 0.0001,    then H,
if    0.0001 > conf,            then I,
```

FIG. 9

FACE RECOGNITION METHOD USING ARTIFICIAL NEURAL NETWORK AND APPARATUS THEREOF

This application claims priority from Korean Patent Application No. 2002-47898, filed on Aug. 13, 2002, the contents of which are incorporated herein by reference in their entirety.

BACKGROUND OF THE INVENTION

1. Field of the Invention

The present invention relates to a method and apparatus for recognizing a face by using a neural network, and more particularly, to a face recognition method and apparatus in which after a neural network is trained by using a predetermined face image, the characteristics of a face image that is the object of recognition are extracted and provided to the trained neural network, and by determining whether or not the object face image is the same as the trained face image, a face is recognized.

2. Description of the Related Art

In the process of moving toward a 21st century information society, information of organizations as well as individuals has become increasingly important. In order to protect this important information, a variety of passwords are used and other technologies capable of confirming identity are strongly demanded. Among the technologies, a face recognition technology is regarded as one of the most convenient and competitive identification methods, because it has advantages in which identification is performed without any specific motion or action of a user, and even when the user does not perceive it.

Beyond protection of information, social demands for confirmation of identity as in a credit card, a cash card, and an electronic resident registration certificate, are continuously increasing. However, since there has been no supplementary identification method except a password till now, a lot of social problems such as computer crimes have been committed. The face recognition technology is highlighted as a method to solve these social problems. In addition, the face recognition technology has a variety of application fields, such as terminal access control, public place access control systems, electronic albums, and recognition of photos of criminals, and is appreciated as a very useful technology in the information society.

Among the face recognition technologies that are widely used at present, there is a technology in which a face is recognized by applying principal component analysis (PCA) to a face image. The PCA is a technique by which image data is projected to a low-dimension eigenvector space with minimizing loss of eigen-information of an image itself so that information is reduced. Among face recognition methods using the PCA, a method using a pattern classifier, which is trained with principal component vectors extracted from an image which is registered in advance, was widely used. However, the recognition speed and reliability of this method are low if large number of data is used for face recognition. In addition, this method cannot provide a satisfying result for changes in a facial expression or in the pose of a face though it provides strong light resistance as it uses a PCA base vector.

Meanwhile, the performance of face recognition is determined by the performance of a pattern classifier which distinguishes a registered face from an unregistered face. As a method for training this pattern classifier, there is a method using an artificial neural network (hereinafter referred to as "ANN").

Figure 1:
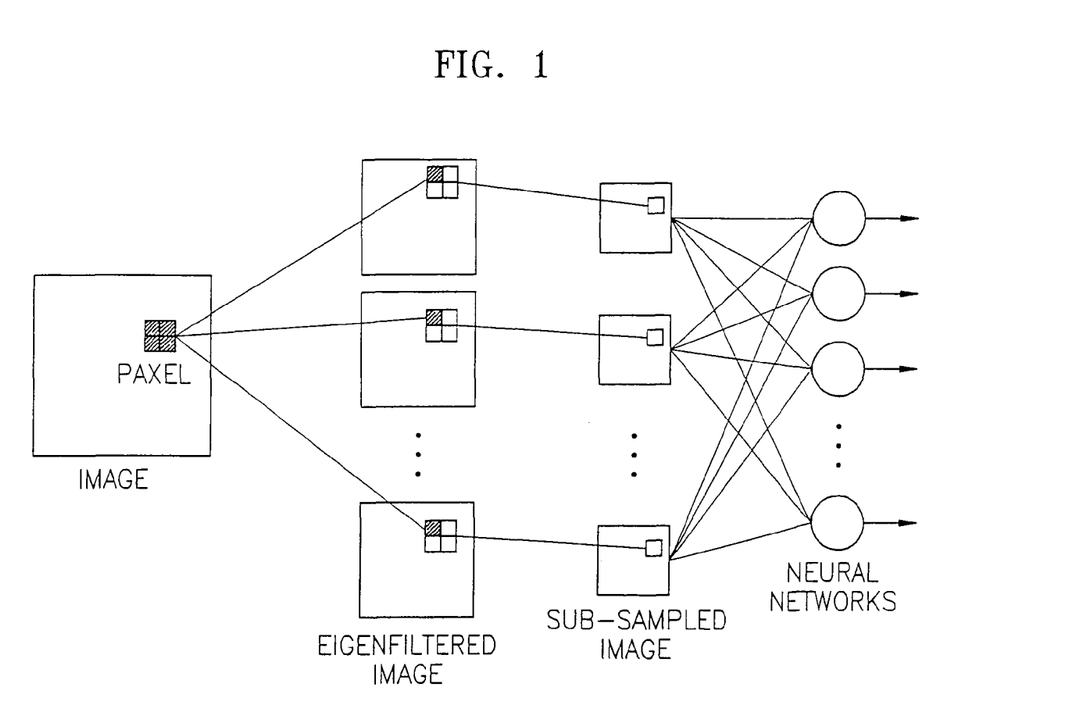
FIG. 1 is a block diagram of an example of a face recognition apparatus using a prior artificial neural network.

FIG. 1 is a block diagram of an example of a face recognition apparatus using an ANN-PCA method.

When a 2-dimensional window having a size defined based on experiments is defined as a paxel, the face recognition apparatus of FIG. 1 performs eigenfiltering (or convolution) with moving an N×N size paxel window. At this time, a paxel window indicates M eigenpaxel kernels obtained by applying the PCA method to each block after an arbitrary learning image is divided into blocks of a predetermined size. Since the eigenfiltered image has too high dimensions as an input vector to a neural network, the dimension of the vector is reduced through a sub-sampling technique so that the image can be input to the neural network.

However, without considering the characteristic of an eigenpaxel kernel, the face recognition apparatus of FIG. 1 uses all input vectors as input values for the neural network. Accordingly, the amount of computation for neural network learning increases, which in turn lengthens a time taken for the computation, and degrades recognition performance and convergence.

SUMMARY OF THE INVENTION

The present invention provides a face recognition apparatus which, by reducing the amount of computation required in neural network learning, enables high speed convergence of neural network, and is appropriate to face recognition with a large amount of data.

According to an aspect of the present invention, there is provided a face recognition apparatus which recognizes a face by using an artificial neural network, comprising an eigenpaxel selection unit which generates eigenpaxels representing characteristic patterns of a face and selects a predetermined number of eigenpaxels among the generated eigenpaxels; an eigenfiltering unit which filters an input facial image with the selected eigenpaxels; a predetermined number of neural networks, each of which corresponds to one of the selected eigenpaxels, receives an image signal which is filtered by the corresponding eigenpaxel, and output a face recognition result; and a determination unit which receives the recognition results from each of the neural networks and outputs a final face recognition result of the input image.

According to another aspect of the present invention, there is provided a face recognition apparatus which recognizes a face by using an artificial neural network, comprising an eigenpaxel selection unit which generates eigenpaxels representing characteristic patterns of a face and selects a predetermined number of eigenpaxels among the generated eigenpaxels; an input image normalization unit which receives a face image and outputs a face image normalized in a predetermined format; an eigenfiltering unit which filters the normalized input image with the respective selected eigenpaxels; a sub-sampling unit which sub-samples the images filtered by respective eigenpaxels and outputs images of a size appropriate for neural network input; a predetermined number of neural networks, each of which corresponds to one of the selected eigenpaxels, receives an image signal which is filtered with a corresponding eigenpaxel and sub-sampled, and outputs a face recognition result; and a determination unit which receives the recognition result from each of the neural networks and outputs a final face recognition result of the input image.

In the apparatus, the determination unit comprises a reliability value calculation unit which converts the received output value of the output layer neurons of each neural network into a value in a predetermined range, calculates reliability values, and adds reliability values for the output layer neurons of each neural network; a face selection unit which selects a face detected by a predetermined number of high level neural networks according to the reliability value; a grade calculation unit which gives a grade to the reliability value of each neural network, and for the selected face, calculates a first grade order of the entire neural network and a second grade order of a predetermined number of high level neural networks; a grouping unit 257 which classifies the selected faces into predetermined face groups, by comparing the first grade order and second grade order with a predetermined first threshold grade order and a predetermined second threshold grade order, respectively; and a recognition result output unit which outputs a face belonging to a first face group having a first grade and a second grade bigger than the first threshold grade order and the second threshold grade order, respectively, as the recognition result.

According to still another aspect of the present invention, there is provided a face recognition method for recognizing a face by using an artificial neural network, comprising: (a) generating eigenpaxels indicating characteristic patterns of a face and selecting a predetermined number of eigenpaxels among the generated eigenpaxels; (b) training the neural network by using the selected eigenpaxels; (d) obtaining an eigenfiltered image containing patterns of face characteristics corresponding to the eigenfilters by eigenfiltering an input image with the respective selected eigenpaxels; (f) performing face recognition on each pattern of face characteristics by outputting the eigenfiltered image to a neural network corresponding to each of the selected eigenpaxels; and (g) analyzing the face recognition result of each neural network and outputting a final face recognition result of the input image. According to yet still another aspect of the present invention, there is provided a face recognition method for recognizing a face by using an artificial neural network, comprising: (a) generating eigenpaxels representing characteristic patterns of a face and selecting a predetermined number of eigenpaxels among the generated eigenpaxels; (b) training the neural network using the selected eigenpaxels; (c) normalizing an input face image into a predetermined form of the face image; (d) obtaining an eigenfiltered image containing patterns of face characteristics corresponding to the eigenfilters by eigenfiltering the normalized face image with the respective selected eigenpaxels; (e) obtaining an image of a size appropriate to a neural network input by sub-sampling each of the eigenfiltered images; (f) performing face recognition on each pattern of face characteristics by outputting the eigenfiltered and sub-sampled image to a neural network corresponding to each of the selected eigenpaxels; and (g) analyzing the face recognition result of each neural network and outputting a final face recognition result of the input image.

In the method, the step (g) comprises: (g1) converting the output value of the output layer neurons into a value in a predetermined range, calculating reliability values, and adding reliability values for the output layer neurons of each neural network; (g2) selecting a face detected by a predetermined number of high level neural networks according to the reliability value; (g3) giving a grade to the reliability value of each neural network, and for the selected face, calculating a first grade order of the entire neural network and a second grade order of a predetermined number of high level neural networks; (g4) classifying the selected faces into predetermined face groups, by comparing the first grade order and second grade order with a predetermined first threshold grade order and a predetermined second threshold grade order, respectively; and (g5) outputting a face belonging to a first face group having a first grade and a second grade bigger than the first threshold grade order and the second threshold grade order, respectively, as the recognition result.

BRIEF DESCRIPTION OF THE DRAWINGS

The above objects and advantages of the present invention will become more apparent by describing in detail preferred embodiments thereof with reference to the attached drawings in which:

FIG. 2b is a block diagram of the structure of a determination unit shown in FIG. 2a;

FIG. 9 is a diagram showing the order of output neurons of each neural network, the neurons which are input to the determination unit of FIG. 2a.

DESCRIPTION OF THE PREFERRED EMBODIMENTS

Figure 2A:
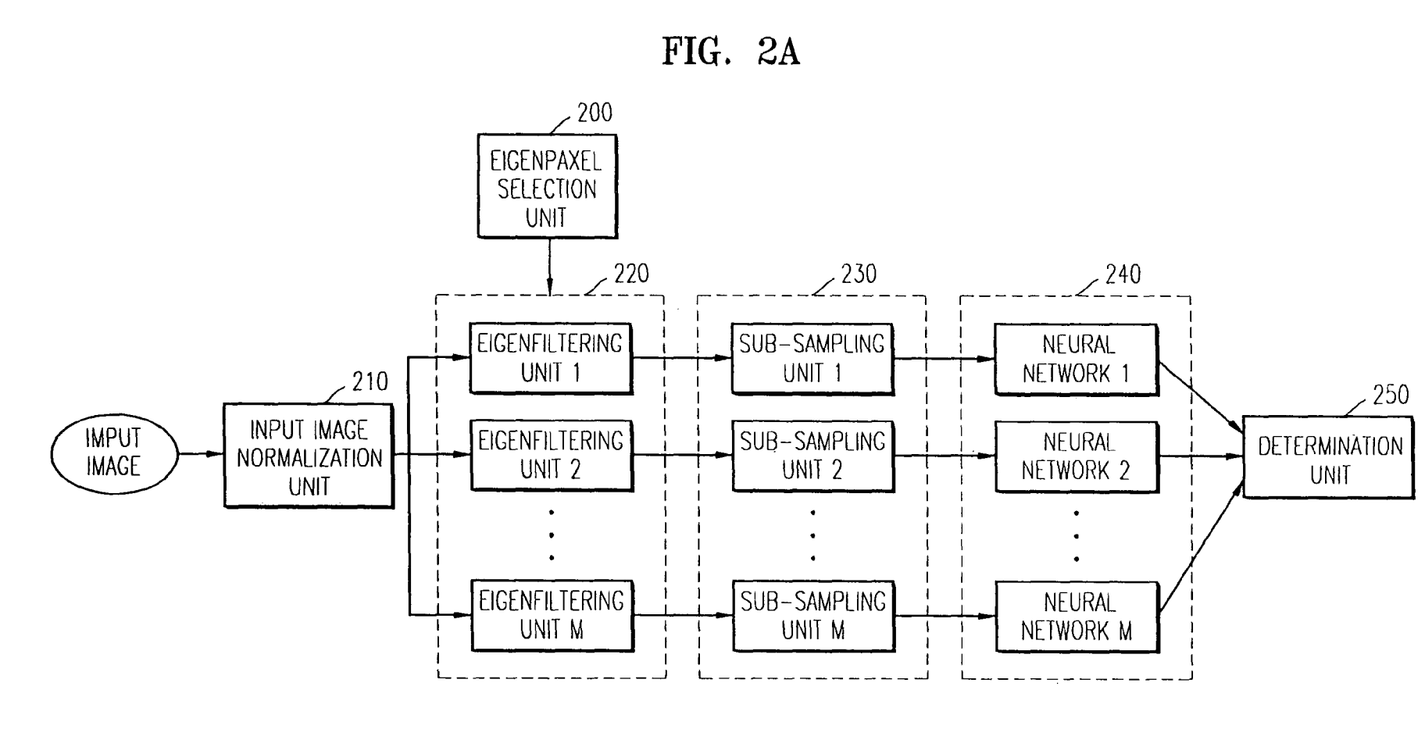
FIG. 2a is a block diagram of the structure of a face recognition apparatus according to a preferred embodiment of the present invention.
Figure 2B:
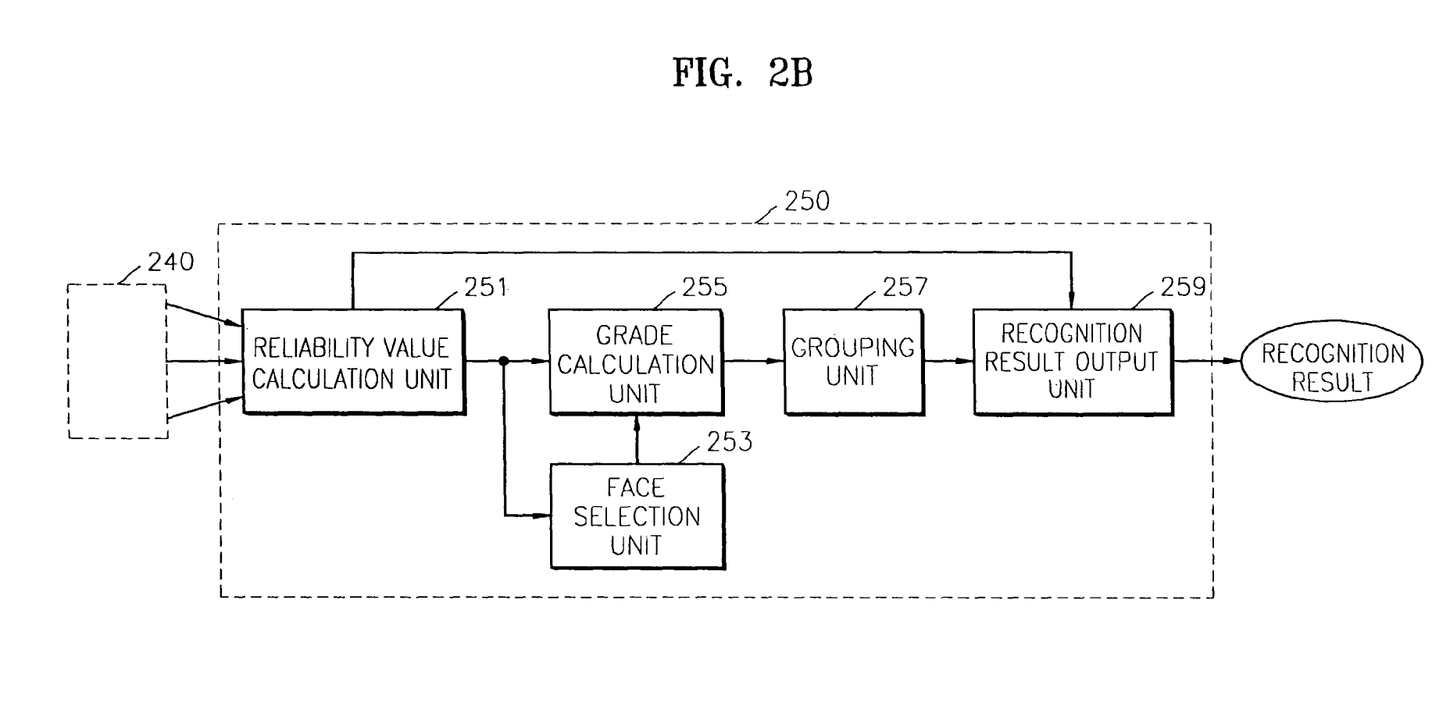

FIGS. 2a and 2b are diagrams of the structure of a face recognition apparatus according to a preferred embodiment of the present invention.

The face recognition apparatus using an ANN of the present invention comprises an eigenpaxel selection unit 200 which generates a predetermined number of eigenpaxels indicating characteristic patterns of a face and selects a predetermined number of eigenpaxels among the generated eigenpaxels; an input image normalization unit 210 which receives the face image and normalizes the image into a predetermined form; an eigenfiltering unit 220 which filters the normalized input image with selected eigenpaxels; a subsampling unit 230 which sub-samples the images filtered by respective eigenpaxels and outputs images of a size appropriate for neural network input; a predetermined number of neural networks 240 which are arranged in parallel so as to correspond to respective selected eigenpaxels, receive an image signal that is filtered by a corresponding eigenpaxel and sub-sampled, and outputs the result of face recognition; and a determination unit 250 which receives a reliability value from each neural network 240 and outputs the face recognition result of the image which is the object of recognition.

Figure 3:
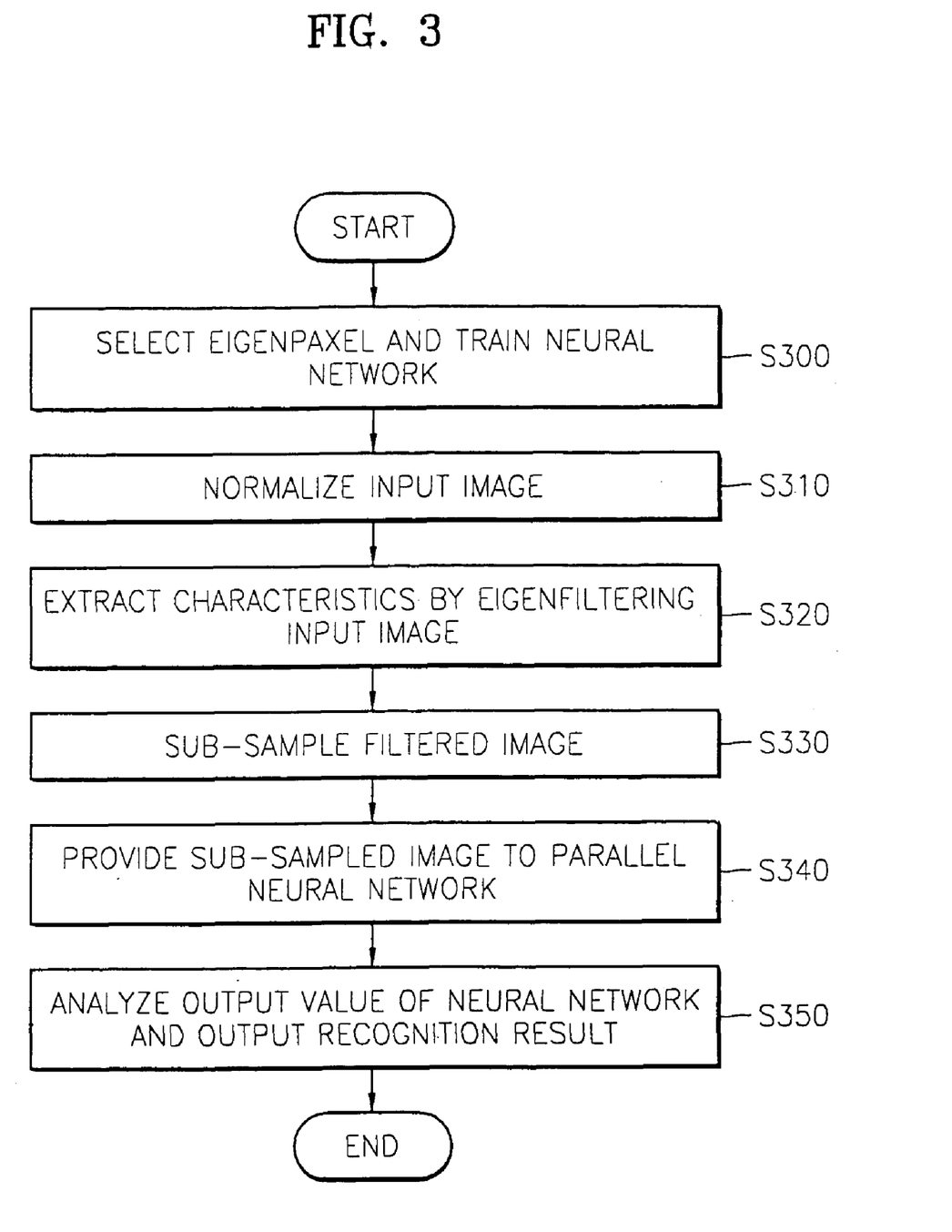
FIG. 3 is a flowchart of the steps performed by a face recognition method according to a preferred embodiment of the present invention.

FIG. 3 is a flowchart of the steps performed by a face recognition method according to a preferred embodiment of the present invention.

In order to recognize an input face image and to determine whether or not the input face is a registered face according to the present invention, first, a predetermined number of eigenpaxels should be selected, and by using the selected eigenpaxels, the neural network 240 which operates as a pattern classifier in the present invention should be trained in advance.

The eigenpaxel used in the present invention will now be explained. First, an arbitrary image used in the training of the neural network 240 is divided into blocks of a predetermined size, and each of the divided blocks is defined as a paxel. When the PCA is applied to each paxel, eigenpaxels shown in FIG. 5 are obtained.

Each eigenpaxel represents the characteristic of a face area. The first eigenpaxel shown in FIG. 5 represents a flat part in the face area. Eigenpaxels that show the characteristics of being distributed as slanting lines, such as second and third eigenpaxels, represent the characteristics of a part where slanting lines are distributed, such as a chin line.

The size of these paxels is determined by how satisfactory the training result and recognition result of the neural network are compared to the operation speed. That is, if the size of the paxels is too big, the amount of computation increases such that the neural network training and face recognition take too much time. If the size of the paxels is too small, the characteristics of the face cannot be accurately represented. Considering these, the size of paxels is determined.

Figure 5:
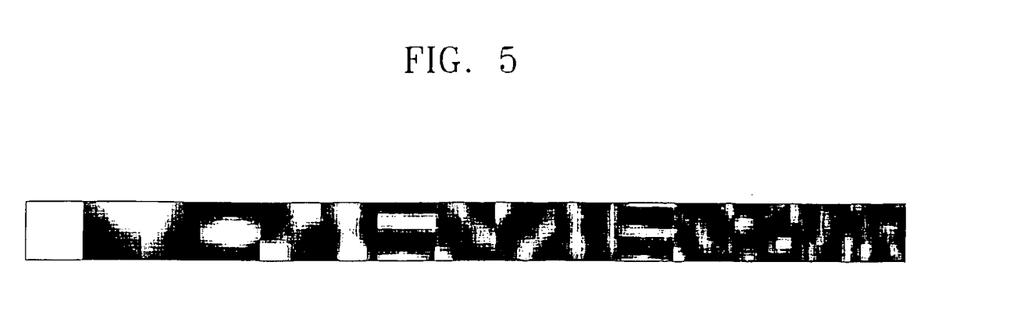
FIG. 5 is a diagram of an example of an eigenpaxel selected by a preferred embodiment of the present invention.

If eigenpaxels as shown in FIG. 5 are obtained, the eigenpaxel selection unit 200 arranges the obtained eigenpaxels by decreasing order of eigenvalue, that is, in order in which eigenpaxels having the bigger eigenvalue are arranged first. Among them, the eigenpaxel selection unit 200 selects a predetermined number (hereinafter referred to as "M") of eigenpaxels. In FIGS. 5, 15, 16×16 size eigenpaxels are arranged in order of decreasing eigenvalue.

Meanwhile, if a predetermined number of eigenpaxels to be used in training and face recognition are selected, the neural network is trained in the same process as the process for face recognition to be explained later. In the present invention, as an example of learning, the neural network is trained using a supervised learning method which is one of ordinary neural network training methods.

Figure 6:
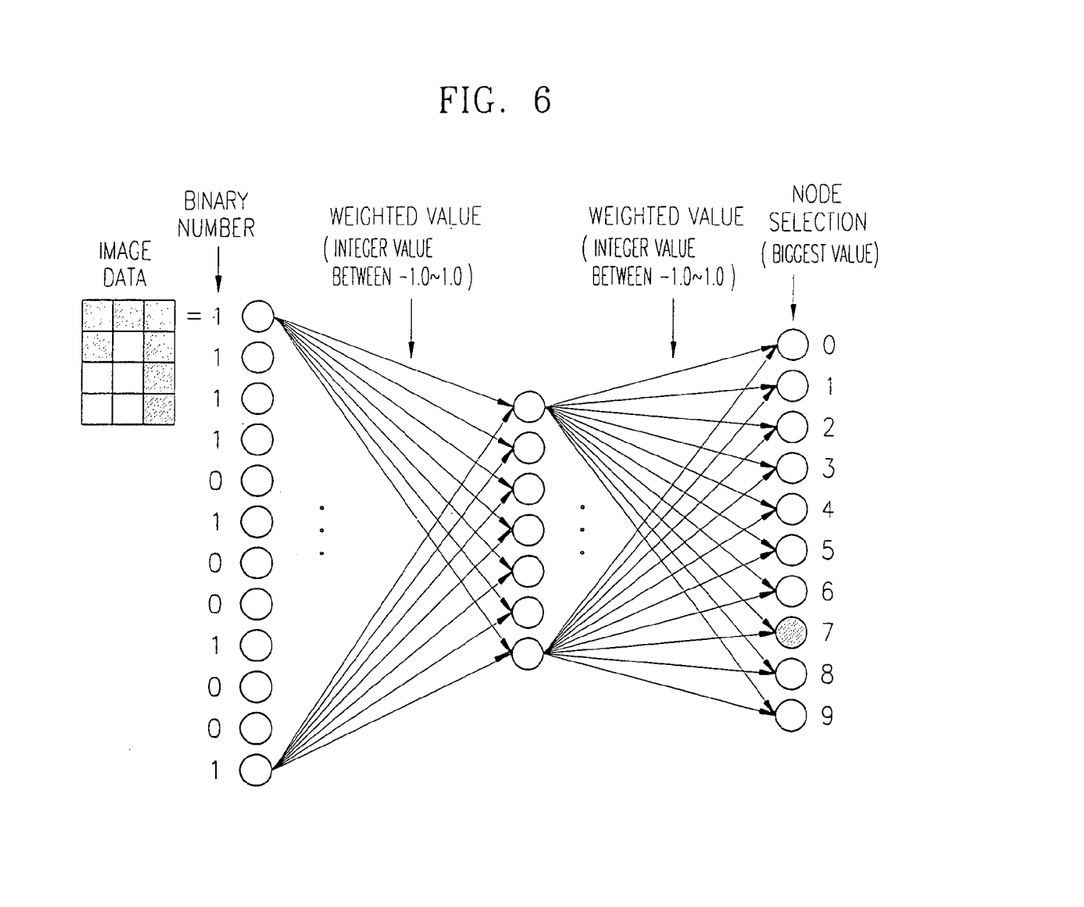
FIG. 6 is a diagram of the structure of an ordinary artificial neural network.

FIG. 6 is a diagram of the structure of an ordinary ANN. An ordinary ANN includes an input layer, a hidden layer, and an output layer. The hidden layer may be constructed as 1 or more layers as needed. As an algorithm for training the neural network, a back propagation algorithm having momentum is used in the present embodiment. This algorithm is obtained by adding momentum to prevent oscillation, to a well-known back propagation when an error area is very narrow. An updated weighting coefficient for learning is calculated by the following equation (1):

$$\Delta W_{ij}(t+1) = \eta \delta_j o_i + \alpha \Delta W_{ij}(t) \quad (1)$$

Here, $\eta$ denotes a learning coefficient, j denotes the index of a current unit, i denotes the index of a unit preceding the unit j, $\delta_j$ denotes the output error of unit j, $O_i$ denotes the output of unit i, and $\alpha$ denotes a constant determining the affect of momentum.

In the present embodiment, 2 types of learning methods, brief learning and intensive learning, are used.

For the brief learning, setting values are $\eta=0.1$, $\alpha=0.5$, $c=0.05$, $d_{max}=0.01$, and for the intensive learning, setting values are $\eta=0.01$, $\alpha=0.0005$, $c=0.01$, $d_{max}=0.0001$. Here, c denotes the amount of flat spot elimination, and $d_{max}$ denotes a maximum non-propagation error. The learning function is set to an arbitrary weight value between the scope [−1.1] at first, and then is updated in accordance with a topology order. If the error becomes about 0.0001 or less, the learning stops. In general, all neural networks briefly learn and only a predetermined number of neural networks (4 high level neural networks in the present embodiment) learn intensively.

If eigenpaxels are selected and the neural network 240 is trained, the input image normalization unit 210 receives a face image to verify, normalizes the image into a grey level, and outputs the normalized image to the eigenfiltering unit 220 in step S310.

The eigenfiltering unit 220 performs respective eigenfiltering for the normalized input image using M eigenpaxel selected in the eigenpaxel selection unit 200, and obtains M eigenfiltered images representing the characteristic of the face in step S320.

The eigenfiltering unit 220 filters the input image, by performing convolution operation with moving each eigenpaxel on the normalized input image. More specifically, if the input image is divided into predetermined blocks, and then convolution operation is performed moving the divided blocks over the eigenpaxels such that the blocks and eigenpaxels overlap to a predetermined percent, then an image which is eigenfiltered and reduced to a predetermined size is obtained.

In the present embodiment, 10, 16×16 size eigenpaxels are used and the input image is respectively eigenfiltered with a convolution overlapping percentage of 75%. Though a result guaranteeing a certain degree of recognition performance can be obtained even with 4 or 5 eigenpaxels, in order to obtain ad more reliable result, 10 eigenpaxels are selected in the embodiment of the present invention and eigenfiltering is performed for a known Olivetti database (DB) having 10 images for each of 40 persons, mainly about facial expressions and poses. The original image stored in the Olivetti DB is a 92×112 size image, and if this image is filtered with a 16×16 size eigenpaxel, a 20×25 eigenfiltered image is obtained.

However, the image obtained by eigenfiltering using each eigenfilter still has high image dimension and not appropriate as an input to the neural network 240. Accordingly, the sub-sampling unit 230 sub-samples the filtered image to reduce the dimensions of the vector in step S330.

In the present embodiment, 2×2 size sub-sampling is performed on the 20×25 size eigenfiltered image so that the image is sub-sampled to a 10×12 size image. By doing so, the dimensions of the vector to be input to the neural network 240 are reduced.

The sub-sampling unit 230 provides the sub-sampled image to the parallel-type neural network 240 in step S340. First, the reason why the present invention adopts the parallel structure and the neural network 240 will now be explained.

Figure 7:
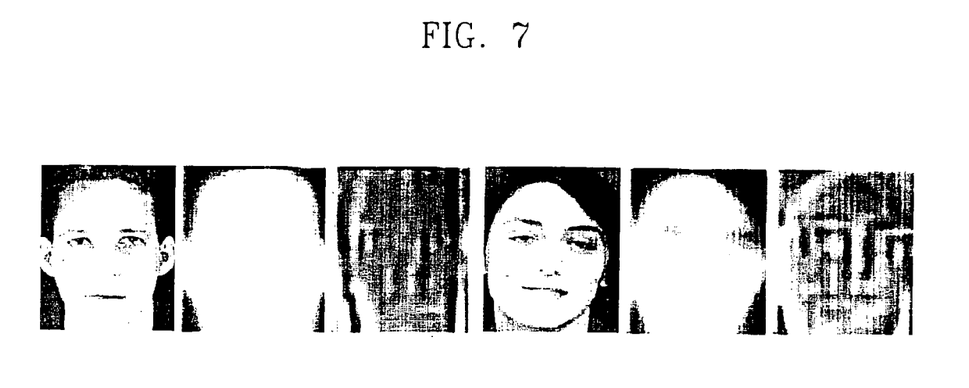
FIG. 7 shows images which are obtained from two input images through eigenfiltering with first and tenth eigenpaxel.

FIG. 7 shows images which are obtained from two input images through eigenfiltering with first and tenth eigenpaxels of FIG. 5, respectively. As shown in FIG. 7, even though identical face images are used, vector images obtained after filtering with eigenpaxels are different to each other. Meanwhile, even though different face images are used, vector images obtained after filtering with the same eigenpaxels are similar to each other.

Accordingly, since even with an identical face, images filtered with different eigenfilters show different characteristics, a neural network should be taught that the images having these different characteristics are an identical face image, by inputting the image vectors described above in the identical neural network. For this, a substantial amount of learning image data and complicated learning algorithms are needed. As a result, the learning convergence speed of the neural network becomes very low.

As the statistical characteristic of neural network input vectors, which are obtained as response values of M eigenpaxel filters, each filter has a unique characteristic. In order to achieve the goal of face recognition, which is finding changes in the identity of a human face, it is desirable that a neural network that can learn changes in identity only with response values of filters having an identical characteristic is established.

Therefore, as shown in FIG. 2, the present invention adopts a parallel structure neural network 240, in which each response value obtained through filtering an image through eigenpaxels is provided to an individual neural network corresponding to each eigenpaxel so that face learning and face recognition can be performed.

Each network in the parallel structure neural network 240 has the structure of an ordinary neural network as shown in FIG. 6. The number of neurons in the hidden layer is determined so that links enough to show a good recognition performance are enabled. In the present embodiment learning 40 persons with 5 face images for each person stored in the Olivetti DB, 60 neurons are used in the hidden layer. Also, since the number of eigenpaxels is 10 in the present embodiment, 10 neural networks having an identical structure are trained in parallel. In each neural network, since the dimensions of an input vector is 10×12, the number of neurons in the input layer is 120, and the number of neurons in the hidden layer is 60 as described above. Since the number of registered persons that should be classified is 40, the number of the output layer is 40. With these neurons, each neural network is formed.

For reference, when only one neural network is used as in the prior art, the number of input neurons should be the same as the dimensions of input vectors [120]×the number of eigenpaxels [10], and therefore 1200 input neurons are needed. Accordingly, a large number of link combinations should be learned such that the number of hidden neurons should increases with respect to the number of input neurons and learning time increases considerably.

Meanwhile, when the present invention is applied to 250 persons from 500 registered persons by applying 10 eigenpaxels to Hong Ik University DB having 500 registered persons with 10 images of facials expressions and poses for each person, the number of input neurons are the same but the number of output neurons increases to 250, and accordingly the number of needed hidden neurons increases to 100.

Each neural network 240 of FIG. 2 connected in parallel outputs the face recognition result from the input image, which is filtered with eigenpaxels, to the determination unit 250, and the determination unit 250 analyzes the input results and outputs a final face recognition result in step S350.

Figure 4:
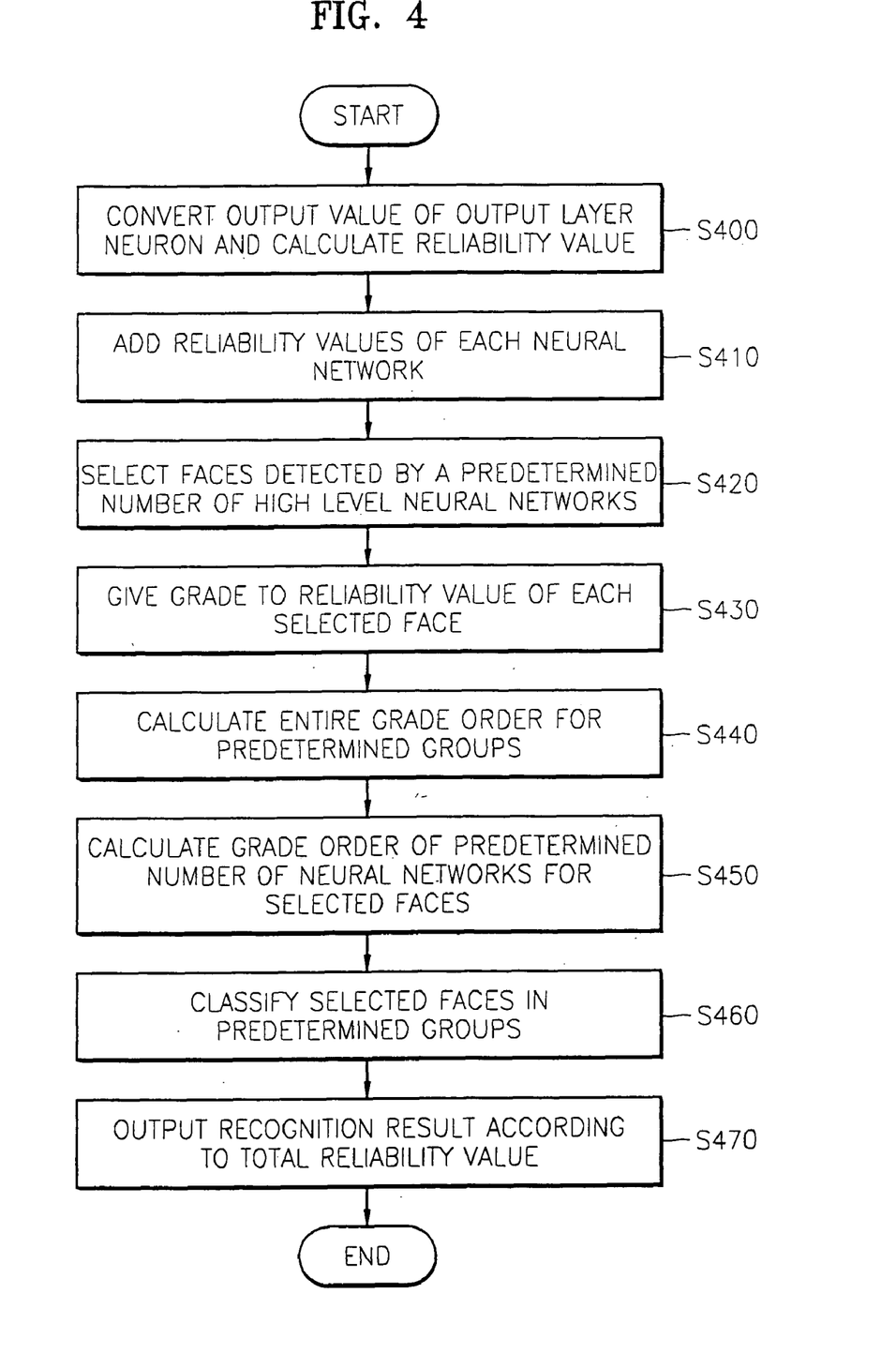
FIG. 4 is a detailed flowchart of the step S350 of FIG. 3.

Referring to FIGS. 4 and 2b, the process for the determination unit 250 of the present invention determining the final face recognition result by putting together the results input by respective neural networks will now be explained.

FIG. 2b is a diagram of the structure of the determination unit 250 of the present invention.

The determination unit 250 of the present invention comprises a reliability value calculation unit 251 which converts the output value obtained from the output neuron into a value in a predetermined range, calculates reliability values, and adds reliability values for the output neuron of each neural network, a face selection unit 253 which selects a face detected by a predetermined number of neural networks according to the reliability value, a grade calculation unit 255 which gives a grade to the reliability value of each neural network, and for the selected face, calculates a first grade order of the entire neural network 240 and a second grade order of a predetermined number of high level neural networks, a grouping unit 257 which classifies selected faces into predetermined face groups, by comparing the first grade order and second grade order of the face selected in the face selection unit, with the first threshold grade order and second threshold grade order, respectively, and a recognition result output unit 259 which outputs a face belonging to a predetermined face group as a recognition result. FIG. 4 is a flowchart explaining a process for outputting a face recognition result by the determination unit 250.

The reliability value calculation unit 251 calculates reliability values by converting the received output values of output layer neurons of each neural network in step S400. Since the scope of output values of the output layer neurons of each network varies greatly, it is difficult to analyze the final recognition result by comparing the recognition results of respective neural networks. Accordingly, in the present invention, it is needed to normalize the output values of the neurons of each neural network so that the output values of different neural networks can be compared with each other. Therefore, in the present invention, the ratio of the sum of the output values of a neural network to each output value of the neural network is used as the output value of a neuron of the neural network.

The reliability value calculation unit 251 of the preferred embodiment of the present invention converts the output value of an output layer neuron of each neural network by using the following equation (2) in order to calculate the reliability value:

$$y_\alpha = \frac{\exp(10 w_\alpha)}{\sum_\beta \exp(10 w_\beta)} \quad (2)$$

Here, $w_\alpha$ denotes the actual output value of each neuron of a neural network and $\beta$ denotes the total number of output layer neurons.

Then, the reliability value calculation unit 251 obtains a reliability value by multiplying the difference between the maximum value among the converted values and the second largest value, by the maximum value. In the preferred embodiment of the present invention, the output value converted by the equation 2 is substituted in the following equation (3) in order to calculate a reliability value:

$$\text{conf} = y_{max,1}(y_{max,1} - y_{max,2}) \quad (3)$$

Here, $y_{max,1}$ denotes the largest converted output value and $Y_{max,2}$ denotes the second largest converted output value. The reliability value calculated by the equation 3 is given to the output layer neuron having the largest output value in each neural network and the reliability values of the remaining output layer neurons are set to 0.

The reliability value calculation unit 251 adds the reliability values of each neural network obtained by the process described above, for each of output neurons in step S410.

Figure 9:
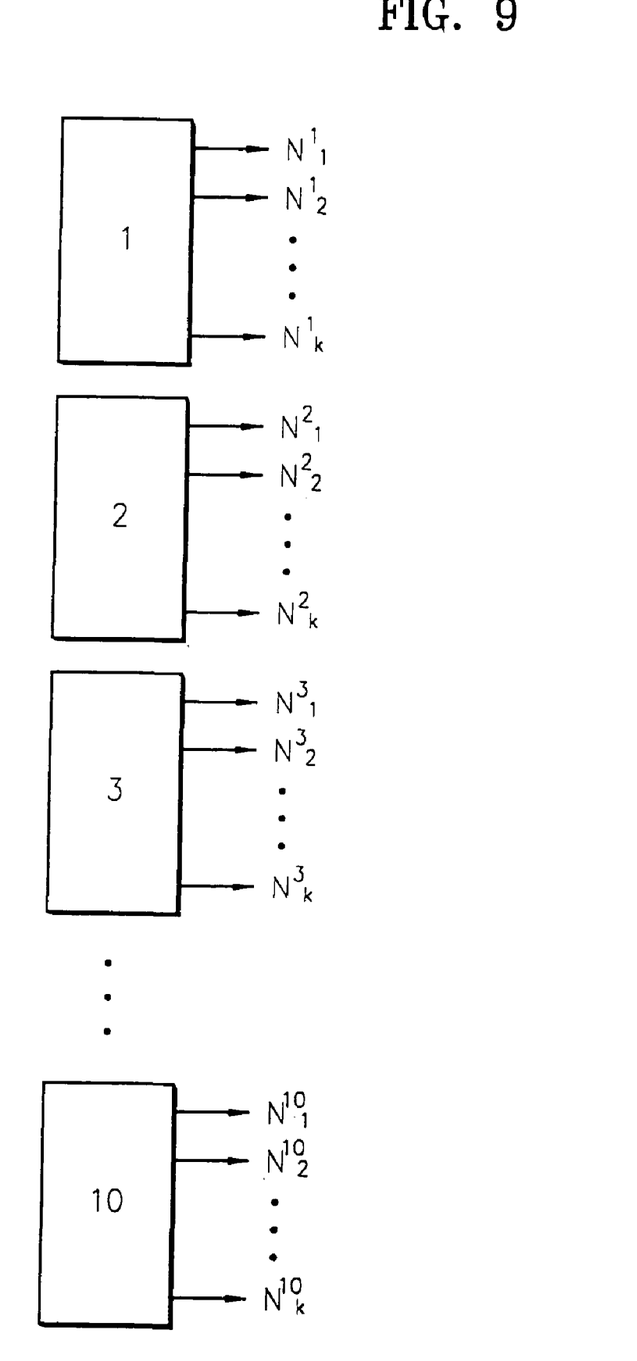

Referring to FIG. 9, each neural network (1 through 10) has k output neurons as shown. Accordingly, the sum (S1 through Sk) of reliability values for each output neuron is as follows:

$$S1 = N^1_1 + N^2_1 + N^3_1 + N^4_1 + \ldots N^{10}_1$$

$$S2 = N^1_2 + N^2_2 + N^3_2 + N^4_2 + \ldots N^{10}_2$$

$$S3 = N^1_3 + N^2_3 + N^3_3 + N^4_3 + \ldots N^{10}_3$$

$$\ldots$$

$$Sk = N^1_k + N^2_k + N^3_k + N^4_k + \ldots N^{10}_k$$

Here, each output neuron is represented by $N^m_n$, m denotes each neural network and n denotes the ordinal of an output neuron in each neural network as shown in FIG. 9.

Since each output node of a neural network corresponds to a registered person and i-th node of each neural network corresponds to an identical person, the entire reliability value of an input image is calculated by adding the reliability values of an identical output neuron in each neural network. The sum of reliability values is to be used in step S470 for finally determining the recognition result, which will be explained later.

The face selection unit 253 receives the reliability calculation result from the reliability value calculation unit 251, and selects a face detected by the predetermined number of high level neural networks in step S420.

As described above, since the reliability value is given to only one output neuron representing the highest output value among output neurons in each neural network, and each output neuron corresponds to a learned face, one face is detected in each neural network. The face selection unit 253 detects a face from the predetermined number of high level neural networks, that is, four high level neural networks in the present embodiment, and selects candidate faces.

For example, it is assumed that the reliability values obtained by the equation (3) described above are as follows:

$$N^1_1 = 0.9, N^1_2 = 0, N^1_3 = 0, N^1_4 = 0, \ldots N^1_k = 0$$

$$N^2_1 = 0, N^2_2 = 0.7, N^2_3 = 0, N^2_4 = 0, \ldots N^2_k = 0$$

$$N^3_1 = 0, N^3_2 = 0, N^3_3 = 0, N^3_4 = 0, \ldots N^3_k = 0.01$$

$$N^{14}_1 = 0, N^4_2 = 0, N^4_3 = 0.1, N^4_4 = 0, \ldots N^4_k = 0$$

$$\ldots$$

$$N^{10}_1 = 0.8, N^{10}_2 = 0, N^{10}_3 = 0, N^{10}_4 = 0, \ldots N^{10}_k = 0$$

Then, the faces selected by the face selection unit 153 are faces corresponding to the first, second, k-th, and third output neurons detected by the four high level neural networks.

Figure 8:
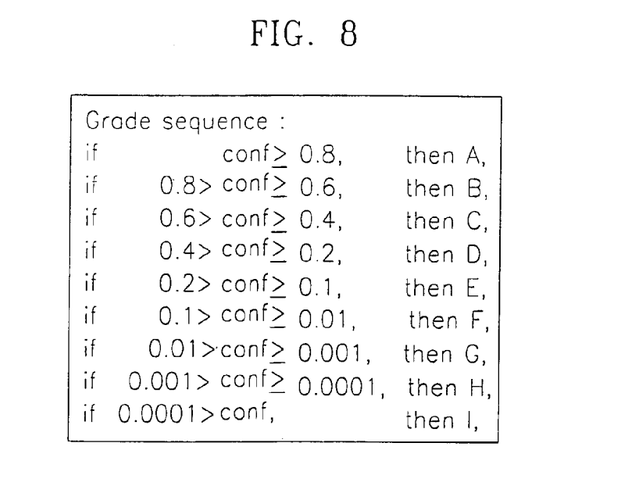
FIG. 8 is a table showing the ranges of applied grades when grades are given.

The grade calculation unit 255 gives a grade to each reliability value input by the reliability value calculation unit 251 according to the table of FIG. 8 in step S430.

Referring again to the example described above, since the reliability value of the first output neuron of the first neural network is 0.9, grade A is given according to the table of FIG. 8, and 0 is given to the remaining output neurons such that A000, . . . ,0 is given to the first neural network.

In the same manner as in the first neural network, 0B00, . . . ,0 is given to the second neural network, 0000, . . . , F is given to the third neural network, 00E0, . . . ,0 is given to the fourth neural network, and grades are given to the fifth to the ninth neural networks, and finally A000, . . . ,0 is given to the tenth neural network.

After giving grades to respective reliability values of the neural networks, the grade calculation unit 255 receives the selected face from the face selection unit 253, and calculates the entire grade order for the selected face in step S440.

Referring again to the example described above, the faces selected by the face selection unit 253 are the first, second, k-th, and third faces and a grade order is calculated by arranging the grades of the neural networks corresponding to the four faces in order. For example, the grade of the first face selected in the first neural network is calculated as A in the first neural network, 0 in the second neural network, 0 in the third neural network, and is calculated in the same manner in the fourth through ninth neural networks, and then, finally is calculated as A in the tenth neural network.

The grade orders of the four faces selected by the method described above are as follows:

$$G1 = N^1_1, N^2_1, N^3_1, N^4_1, \ldots N^{10}_1 = A00000000A$$

$$G2 = N^1_2, N^2_2, N^3_2, N^4_2, \ldots N^{10}_2 = 0B00000000$$

$$G3 = N^1_2, N^2_3, N^3_3, N^4_3, \ldots N^{10}_3 = 000E000000$$

$$\ldots$$

$$GK = N^1_k, N^2_k, N^3_k, N^4_k, \ldots N^{10}_k = 00F0000000$$

The grade calculation unit 255 obtains the entire grade for the selected faces and then calculates a grade order (hereinafter referred to as "reference grade order") for a predetermined number of neural networks from the entire grade in step S450.

For example, if the reference grade order for the four neural networks is obtained from the previous grade order, then $G1 = N^1_1, N^2_1, N^3_1, N^4_1 = A000$, $G2 = N^1_2, N^2_2, N^3_2, N^4_2 = 0B00$, $G3 = N^1_3, N^2_3, N^3_3, N^4_3 = 000E$, $Gk = N^1_k, N^2_k, N^3_k, N^4_k = 00F0$. At this time, it is desirable that the predetermined number of neural networks is the neural networks that determine the candidate faces, but more number of neural networks may also be selected.

The grouping unit 257 receives the selected faces and the entire grade order and reference grade order for the selected faces from the grade calculation unit 255, and classifies the selected faces into predetermined groups by comparing the entire grade order and reference grade order of each face with a predetermined first threshold grade order for the entire grade order and a predetermined second threshold grade order for the reference grade order, respectively, in step S460.

By the comparison described above, the grouping unit 257 classifies the selected faces into a first group which has grade orders exceeding the first threshold value and second threshold value, a second group which has grade orders exceeding only one of the first threshold and the second threshold, and a third group which has grade orders not exceeding both the first and second threshold values. At this time, the grouping unit 257 compares each grade order with threshold values by algebraically comparing the high and low of a grade.

Referring to the example described above, if it is assumed that the first threshold value is BBBBAAAAAA and the second threshold value is 0CAA, the entire grade order of the first face is A00000000A and higher than the first threshold value, and the reference grade order is A000 and also higher than the second threshold value. Accordingly, the first face is determined to be in the first group.

Meanwhile, the entire grade order of the second face is 0B00000000 and lower than the first threshold value, but the reference grade order is 0B00 and higher than the second threshold value. Accordingly, the second face is determined to be in the second group. For the third and k-th faces, the same method is applied for grouping. Then, each face and a corresponding group are output to the recognition result output unit 259.

The recognition result output unit 259 outputs the face recognition result according to the input faces and the corresponding groups in step S470.

The recognition result output unit 259 outputs a face belonging to the first group among the input faces, as the recognition result, and if there is no face belonging to the first group, then outputs a face belonging to the second group, as the recognition result. Meanwhile, if there are a plurality of faces belonging to the same group, a face having a bigger sum of reliability values for the face calculated in the step S410 described above is output as the recognition result.

Meanwhile, the face recognition experiment results according to the preferred embodiment of the present invention are shown in Tables 1 and 2:

TABLE 1

|  | 1st experiment | 2nd experiment |
| --- | --- | --- |
| Outputting 1 face | 4.5% | 4.5% |
| Outputting 2 faces | 3.0% | 3.0% |
| Outputting 3 faces | 2.5% | 2.5% |

The experiment result shown in Table 1 is obtained from experiments on the Olivetti DB storing 40 persons' faces with 10 face images for each person. For the 1st experiment of Table 1, 200 odd-numbered images among the stored face images were trained, and then 200 even-numbered images were input as the object face images to be recognized. The recognition error results were shown in the table. In the 2nd experiment, 200 even-numbered images were trained and then 200 odd-numbered images were input. In the table, the recognition errors were calculated based on whether or not the recognition object face was included in the recognition result when 1 face was output as the recognition result, when 2 faces were output, and when 3 faces were output, respectively.

TABLE 2

|  | Brief learning case | Intensive learning case |
| --- | --- | --- |
| Outputting 1 face | 6.06% | 5.89% |
| Outputting 2 faces | 4.06% | 3.89% |
| Outputting 3 faces | 3.31% | 3.20% |

The experiment result shown in Table 2 is obtained from experiments on the Hong Ik University (HIU) DB storing 250 persons' faces with 10 face images for each person. The neural network of the present invention was trained with 750 face images among the face images stored in the HIU DB, and face recognition for 1750 images were performed. The error ratios of the neural network for the brief learning case and the intensive learning case are shown in the Table 2.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

According to the present invention, a plurality of neural networks are arranged in parallel, each neural network is trained with eigenfiltered images having similar pattern characteristics, and face recognition is performed such that the learning time of the neural network can be greatly reduced and the learning convergence speed of the neural network can be substantially raised. In addition, according to the present invention, neural networks are arranged in parallel and therefore processors controlling respective neural networks can be arranged in parallel such that the speed of learning and recognition can be greatly improved. Also, since each neural network arranged in parallel learns only a small amount of face images and performs recognition for the face images, the present invention is appropriate to face recognition for faces stored in a database with a large capacity.

What is claimed is:

1. A face recognition apparatus which recognizes a face by using an artificial neural network, comprising:

an eigenpaxel selection unit which generates eigenpaxels representing characteristic patterns of a face and selects a predetermined number of eigenpaxels among the generated eigenpaxels;

an eigenfiltering unit which filters an input facial image with the selected eigenpaxels;

a predetermined number of neural networks, each of which corresponds to one of the selected eigenpaxels, receives an image signal which is filtered by the corresponding eigenpaxel, and output a face recognition result; and a determination unit which receives the recognition result from each of the neural networks and outputs a final face recognition result of the input image.

2. The apparatus of claim 1, wherein the eigenpaxel selection unit comprises:

an eigenpaxel generation unit which divides an arbitrary face image into predetermined blocks, and by applying a principal component analysis to each of the blocks, generates eigenpaxels indicating predetermined pattern characteristics of the face.

3. The apparatus of claim 2, wherein the eigenpaxel selection unit further comprises:

an eigenpaxel selection unit which selects a predetermined number of vectors among the selected eigenpaxels in order of decreasing eigenvalues of the vectors.

4. The apparatus of claim 1, wherein the eigenfiltering unit elgenfilters the input image by performing convolution operation while moving each eigenpaxel for the input image.

5. The apparatus of claim 4, wherein the eigenfiltering unit divides the input image into predetermined blocks, and performs convolution operations moving the divided blocks over the eigenpaxels such that the blocks and eigenpaxels overlap to a predetermined part, and outputs an eigenfiltered image which is reduced to a predetermined size.

6. The apparatus of claim 1, wherein the neural network is trained by a back propagation algorithm having added momentum, and at this time weighting coefficient ($w_i$) is updated by the following equation:

$$\Delta W_{ij}(t+1) = \eta \delta_j O_i + \alpha \Delta W_{ij}(t)$$

where $\eta$ denotes a learning coefficient, j denotes the index of a current unit, i denotes the index of a unit preceding the unit j, $\delta_j$ denotes the output error of unit j, $O_i$ denotes the output of unit i, and $\alpha$ denotes a constant determining the affect of momentum.

7. The apparatus of claim 1, wherein the number of neurons in the output layer of the neural network is the same as the number of learned faces.

8. The apparatus of claim 1, wherein the determination unit comprises:
- a reliability value calculation unit which converts the received output value of the output layer neurons of each neural network into a value in a predetermined range, calculates reliability values, and adds reliability values for the output layer neurons of each neural network;
- a face selection unit which selects a face detected by a predetermined number of high level neural networks according to the reliability value;
- a grade calculation unit which gives a grade to the reliability value of each neural network, and for the selected face, calculates a first grade order of the entire neural network and a second grade order of a predetermined number of high level neural networks;
- a grouping unit which classifies the selected faces into predetermined face groups, by comparing the first grade order and second grade order with a predetermined first threshold grade order and a predetermined second threshold grade order, respectively; and
- a recognition result output unit which outputs a face belonging to a first face group having a first grade and a second grade bigger than the first threshold grade order and the second threshold grade order, respectively, as the recognition result.

9. The apparatus of claim 8, wherein the reliability value calculation unit converts each output value of the output layer neurons of each neural network, into a ratio of each output value of the neural network to the sum of the output values of a neural network.

10. The apparatus of claim 9, wherein the reliability value calculation unit converts each output value of the output layer neurons of each neural network according to the following equation:

$$y_\alpha = \frac{\exp(10 w_\alpha)}{\sum_\beta \exp(10 w_\beta)}$$

where $W_\alpha$ denotes the actual output value of each neuron of a neural network and $\beta$ denotes the total number of output layer neurons.

11. The apparatus of claim 10, wherein the grade calculation unit gives a grade to the reliability value of each neural network, and calculates a first grade order, in which the grades of entire neural network for the selected faces are arranged in order from a high level neural network to a low level neural network, and a second grade order, in which the grades of the predetermined number of neural networks for the selected faces are arranged in order from a high level neural network to a low level neural network.

12. The apparatus of claim 10, wherein among a plurality of faces belonging to a first face group, the recognition result output unit outputs a face which is input by the reliability value calculation unit and has a bigger sum of reliability values, as the recognition result.

13. The apparatus of claim 9, wherein the reliability value calculation unit calculates the reliability value of a neural network according to the following equation by using the converted output value:

$$\text{conf} = Y_{max,1}(Y_{max,1} - Y_{max,2})$$

where $Y_{max,1}$ denotes the largest converted output value and $Y_{max,2}$ denotes the second largest converted output value.

14. The apparatus of claim 13, wherein the reliability value of the neural network is set as the reliability value of an output layer neuron having the largest converted output value, and the reliability values of the remaining output layer neurons are set to 0.

15. A face recognition apparatus which recognizes a face by using an artificial neural network, comprising:
- an eigenpaxel selection unit which generates eigenpaxels representing characteristic patterns of a face and selects a predetermined number of eigenpaxels among the generated eigenpaxels;
- an input image normalization unit which receives a face image and outputs a face image normalized in a predetermined format;
- an eigenfiltering unit which filters the normalized input image with the respective selected eigenpaxels;
- a sub-sampling unit which sub-samples the images filtered by respective eigenpaxels and outputs images of a size appropriate for neural network input;
- a predetermined number of neural networks, each of which corresponds to one of the selected eigenpaxels, receives an image signal which is filtered with a corresponding eigenpaxel and sub-sampled, and outputs a face recognition result; and
a determination unit which receives the recognition result from each of the neural networks and outputs a final face recognition result of the input image.

16. A face recognition method for recognizing a face by using an artificial neural network, comprising:
(a) generating eigenpaxels representing characteristic patterns of a face and selecting a predetermined number of eigenpaxels among the generated eigenpaxels;
(b) training the neural network using the selected eigenpaxels;
(d) obtaining an eigenfiltered image containing patterns of face characteristics corresponding to the eigenfilters by eigenfiltering an input image with the respective selected eigenpaxels;
(e) performing face recognition on each pattern of face characteristics by outputting the eigenfiltered image to a neural network corresponding to each of the selected eigenpaxels; and
(f) analyzing the face recognition result of each neural network and outputting a final face recognition result of the input image.

17. The method of claim 16, wherein the step (a) further comprises:
dividing an arbitrary face image into predetermined blocks, and by applying a principal component analysis to each of the blocks, generating eigenpaxels indicating regular pattern characteristics of the face.

18. The method of claim 17, wherein the step (a) further comprises:
selecting a predetermined number of vectors among the generated eigenpaxels in order of decreasing eigenvalues of the vectors.

19. The method of claim 16, wherein in the step (b), the neural network is trained by a back propagation algorithm having added momentum, and at this time weighting coefficient ($w_i$) is updated by the following equation:

$$\Delta W_{ij}(t+1) = \eta \delta_j o_i + \alpha \Delta W_{ij}(t)$$

where $\eta$ denotes a learning coefficient, j denotes the index of a current unit, i denotes the index of a unit preceding the unit j, $\delta_j$ denotes the output error of unit j, $O_i$ denotes the output of unit i, and $\alpha$ denotes a constant determining the affect of momentum.

20. The method of claim 16, wherein the number of neurons in the output layer of the neural network is the same as the number of learned faces.

21. The method of claim 16, wherein in the step (d) the input image is eigenfiltered by performing convolution operation with moving each eigenpaxel for the input image.

22. The method of claim 21, wherein in the step (d) the input image is divided into predetermined blocks, and convolution operations are performed by moving the divided blocks over the eigenpaxels such that the blocks and eigenpaxels overlap to a predetermined part, and then an eigenfiltered image which is reduced to a predetermined size is obtained.

23. The method of claim 16, wherein the step (b) comprises:
(b1) normalizing the input learning image into a predetermined form;
(b2) eigenfiltering the normalized learning image with the eigenpaxels selected in the step (a) and obtaining an eigenfiltered image containing patterns of face characteristics corresponding to the eigenfilters; and
(b3) by sub-sampling each of the eigenfiltered images and inputting a neural network corresponding to each of the selected eigenpaxels, training each of the neural networks.

24. The method of claim 16, wherein the step (f) comprises:
(f1) converting the output value of the output layer neurons into a value in a predetermined range, calculating reliability values, and adding reliability values for the output layer neurons of each neural network;
(f2) selecting a face detected by a predetermined number of high level neural networks according to the reliability value;
(f3) giving a grade to the reliability value of each neural network, and for the selected face, calculating a first grade order of the entire neural network and a second grade order of a predetermined number of high level neural networks
(f4) classifying the selected faces into predetermined face groups, by comparing the first grade order and second grade order with a predetermined first threshold grade order and a predetermined second threshold grade order, respectively; and
(f5) outputting a face belonging to a first face group having a first grade and a second grade bigger than the first threshold grade order and the second threshold grade order, respectively, as the recognition result.

25. The method of claim 24, wherein the step (f1) further comprises:

converting each output value of the output layer neurons of each neural network, into a ratio of each output value of the neural network to the sum of the output values of a neural network.

26. The method of claim 25, wherein in the step (f1) each output value of the output layer neurons of each neural network is converted according to the following equation:

$$y_\alpha = \frac{\exp(10w_\alpha)}{\sum_\beta \exp(10w_\beta)}$$

where $W_\alpha$ denotes the actual output value of each neuron of a neural network and $\beta$ denotes the total number of output layer neurons.

27. The method of claim 26, wherein the step (f3) comprises:
giving a grade to the reliability value of each neural network; and
calculating a first grade order, in which the grades of entire neural network for the selected faces are arranged in order from a high level neural network to a low level neural network, and a second grade order, in which the grades of the predetermined number of neural networks for the selected faces are arranged in order from a high level neural network to a low level neural network.

28. The method of claim 26, wherein in the step (g5), among a plurality of faces belonging to a first face group, a face which has a bigger sum of reliability values calculated in the step (g1) is output as the recognition result.

29. The method of claim 25, wherein the step (f1) further comprises:
calculating the reliability value of a neural network according to the following equation by using the converted output value:

$$conf = Y_{max,1}(Y_{max,1} - Y_{max,2})$$

where $Y_{max,1}$ denotes the largest converted output value and $Y_{max,2}$ denotes the second largest converted output value.

30. The method of claim 29, wherein the reliability value of each neural network is set as the reliability value of an output layer neuron having the largest converted output value, and the reliability values of the remaining output layer neurons are set to 0.

31. A tangible computer readable medium having embodied thereon a computer program for the face recognition method of claim 24.

32. A tangible computer readable medium having embodied thereon a computer program for the face recognition method of claim 16.

33. A face recognition method for recognizing a face by using an artificial neural network, comprising:
(a) generating eigenpaxels representing characteristic patterns of a face and selecting a predetermined number of eigenpaxels among the generated eigenpaxels;
(b) training the neural network using the selected eigenpaxels;
(c) normalizing an input face image into a predetermined form of the face image;

(d) obtaining an elgenfiltered image containing patterns of face characteristics corresponding to the elgenfilters by eigenfiltering the normalized face image with the respective selected eigenpaxels;
(e) obtaining an image of a size appropriate to a neural network input by sub-sampling each of the elgenfiltered images;
(f) performing face recognition on each pattern of face characteristics by outputting the eigenfiltered and sub-sampled image to a neural network corresponding to each of the selected eigenpaxels; and
(g) analyzing the face recognition result of each neural network and outputting a final face recognition result of the input image.

34. A tangible computer readable medium having embodied thereon a computer program for the face recognition method of claim 33.

* * * * *